United States Patent

Corbitt et al.

[11] Patent Number: 5,602,684
[45] Date of Patent: Feb. 11, 1997

[54] INTERLEAVING VTR EDITING SYSTEM

[76] Inventors: Don Corbitt; Karen Corbitt, both of 17813 NE 100th Ct., Redmond, Wash. 98052

[21] Appl. No.: 153,286
[22] Filed: Nov. 17, 1993

Related U.S. Application Data

[63] Continuation of Ser. No. 919,774, Jul. 24, 1992, abandoned.
[51] Int. Cl.$^6$ ............................................. G11B 27/02
[52] U.S. Cl. ................................ 386/52; 386/110
[58] Field of Search ................... 360/13, 14.1, 14.2, 360/14.3, 11.1, 33.1; 358/313, 312, 311, 335

[56] References Cited

U.S. PATENT DOCUMENTS

| | | | |
|---|---|---|---|
| 4,247,865 | 1/1981 | Mastronardi | 358/312 |
| 4,698,664 | 10/1987 | Nichols et al. | 358/311 X |
| 4,789,894 | 12/1988 | Cooper | 358/312 X |
| 4,930,027 | 5/1990 | Steele et al. | 358/312 X |
| 4,970,666 | 11/1990 | Welsh et al. | 364/522 |
| 5,050,009 | 9/1991 | Takahashi et al. | 360/14.2 X |
| 5,140,434 | 8/1992 | Van Blessinger et al. | 360/11.1 X |
| 5,392,165 | 2/1995 | Hosono et al. | 360/19.1 |

Primary Examiner—Andrew L. Sniezek
Attorney, Agent, or Firm—Graybeal Jackson Haley

[57] ABSTRACT

A VTR editing system able to single frame edit (write to VTR) or capture (read from a VTR) multiple frames of video in a single pass of a video tape, through interleaving the actual frames that are accessed. The system comprises a control circuit which allows interleaving of frames during video edit and capture functions; a memory for storing multiple frames of video data, such as a PC hard disk or RAM; and a transfer circuit for transferring video data input and output, between the video recorder and the memory. The system further performs automatic calibration, system configuration detection, and synchronization signal loopback control, and it supports multiple device control through a single parallel or serial communications path.

12 Claims, 12 Drawing Sheets

INTERLEAVING VTR EDITING SYSTEM

This application is a continuation of application Ser. No. 07/919,774, filed Jul. 24, 1992, now abandoned.

BACKGROUND

The invention relates generally to video image management systems and more particularly to an improved VTR editing system.

A Video Tape Recorder (VTR) is a mechanical device that records a video (television) signal on magnetic tape and plays it back at a later time. There are other devices that perform similar functions with different technology, such as Video Disk Recorders. Such other devices record on magnetic tape, optical disk, or other media. They may record analog or digital signals. For ease of discussion, we will refer to this entire class of devices as VTRs, and call the storage medium used video tape.

VTRs usually conform to a set of national standards. In the United States, the video signal is most commonly compatible with the NTSC (National Television System Committee) standard. This specifies that the display be updated at a rate of 29.97 frames per second (fps). It specifies 525 horizontal lines of video information each frame, of which approximately 486 lines are visible on the display. The frequency allows approximately 760 visible changes in intensity in a single horizontal scan line, although in practice the usable value is between 400 and 600. In summary, NTSC video is approximately 30 fps, with a spatial resolution of 512H×486V picture elements (pixels). Other countries use other video standards, notable PAL (phase alternating-line) and SECAM (sequential color with memory).

VTRs often have multiple recording channels. They can record a video signal, one or more audio signals, and often use a channel to record addressing information. The VTR can modify the contents of one channel without disturbing the contents of the others. The most common format for addressing information in the United States is SMPTE (Society of Motion Picture and Television Engineers) Time Code. It states that each frame of video can be identified by a time expressed in Hours:Minutes:Seconds.Frames. Valid addresses range from 00:00:00.00 to 23:59:59.29. Each frame has 80 binary digits (bits) of information recorded on the time code channel. There are other time code standards, but SMPTE Time Code will be referred to for ease of discussion.

The important difference between a VTR and a Video Cassette Recorder (VCR), at least for the purposes of this disclosure, is that a VTR can modify a single frame of video information without changing the preceding or following frames. This action, called a "single frame edit", allows the creation of computer generated animation.

Computer Graphics and Animation

Personal Computers (PC's) output information on a graphical display. The most common graphical display is a CRT (cathode ray tube), such as a television tube. Almost all computers can output information in a textual form, where each letter is made of a matrix of small dots called pixels. Many computers can output information graphically, where each pixel is controlled individually.

Two common measures of the quality of computer graphics are the number of pixels, the spatial resolution or the screen dimensions (horizontal count "H" by vertical count "V"), and how many colors a single pixel can display, the color resolution or pixel depth. Common screen dimensions are 640H×480V, 800H×600V, 1024H×768V, etc. Common values for pixel depth are 1 bit (on/off), 4 bit ($2^4$=16 colors), 8 bit ($2^8$=256 colors), $15/16$ bit ($2^{15}$=32, 768 colors, 1 bit alpha), and $24/32$ bit ($2^{24}$=16 million colors, 8 bits alpha). (Alpha refers to another attribute of the pixel, such as transparency.) At least 15 bit color is required for today's standard video.

The standard graphics controller that comes with a PC often has a resolution of 800H×600V pixels, with 4 or 8 bits color depth. These color resolutions are insufficient for broadcast video. Typical video applications require spatial resolution of 512H×486V or 640H×486V pixels, with at least 15 bits/pixel color resolution which is achieved with a special graphics output controller.

Refer now to FIG. 1. For a PC to do video work with a VTR, it requires a graphics output controller called a frame buffer 100 (so called because it holds a frame of video) in or connected to the PC which permits single frame editing. A typical frame buffer consists of a video input 102, a memory store 104, a frame buffer control 106, and a video output 108. Video input 102 is used to capture (or grab or record) a video image (from a video camera, recorder, or other source) into memory store 104. Video output 108 displays the contents of the frame buffer. Frame buffer control 106 manages access to the memory store, enables the capture function, and controls special effects.

A common use of "single frame editing" is in the production of computer generated animation. Typically, a computer software program transfers a single graphic image to the frame buffer (taking longer than 1/30th of a second), and that image is then stored as a single frame on a video tape with a single frame edit. The software program then computes the next video frame, places it in the frame buffer, and records that frame to the next frame on the video tape. After the entire animation sequence is recorded, it can be replayed at full speed (30 fps), allowing viewing of the animation produced and providing the illusion of motion. See FIG. 2 illustrating a sequence of 12 frames of animation.

If it were possible to produce or display and record to tape the next video frame in 1/30th of a second, it would not be necessary to perform single frame edits. However, this is beyond the capability of all but a few of the most expensive computers today.

VTR Controller

There needs to be some way for the PC to control the VTR. This control is critical to performing a single frame edit. The timing of a single frame edit depends on characteristics of the VTR and other system components. VTR timing response varies from brand to brand, model to model, and sometimes from unit to unit within a single model. The VTR Controller has to take these variations into account, since a timing error of one frame (1/30th of a second) could ruin the resulting videotape. The VTR Controller 300 interfaces between the PC and the VTR as depicted in FIG. 3. The VTR Controller 300 allows the PC 302 to control the VTR 304 and also returns status information from the VTR to the PC. This information is used in determining the timing and status of VTR commands. Most VTR Controller designers need access to at least one sample of each VTR type supported, in order to determine the timing of each specific VTR model.

Single Frame Editing and Capture

The current method of performing repeated single frame edits is slow, and causes a great deal of wear on the VTR mechanisms. The steps followed in a typical single-frame edit are as follows (Refer to FIGS. 4 and 5a which respectively illustrate the single frame edit steps logically and in reference to a length of video tape.) (Times indicated are approximate):

a. Create the image to be recorded 400 (variable duration, ranges from seconds to hours).

b. Load the image into the frame buffer 402 (1 second).

c. Rewind the video tape 404 to a preroll point 406. This step must be done each time a frame is recorded. Starting from a preroll point (typically 5 or 10 seconds before the edit point) lets the VTR come up to full speed before reaching the edit point (10 seconds).

d. Start playing the VTR 408 (5 seconds).

e. Just before reaching the edit point, turn on the VTR Edit function 410. This command is sent between 1 and 3 frames before reaching the desired frame. The timing varies depending on the VTR model (3/30 second).

f. Wait a short time while the frame is being recorded 412 to video tape (1/30 second).

g. Turn off the Edit function 414. Again, the specific timing depends on VTR model (1/30 second).

h. Fast forward the video tape 416 to the park location 418, typically 10 seconds beyond where the video sequence is being recorded. This is so the video tape with the recorded image won't be degraded by constant contact with the VTR recording head while waiting for the next frame to be prepared. (5 seconds).

i. Stop the VTR 420 (1/30 second).

j. If there are more frames of animation to record 422, advance the preroll, edit, and park points forward one frame, and continue with step (a) to create the next image. The preroll and park points are advanced to prevent excessive wear on a particular location of the video tape by the VTR video heads.

FIGS. 5b and 5c illustrate the repeated steps of FIG. 5a and show the advanced preroll point 406, park point 418, and successive single frame edits 412.

The illustrated procedure takes on the order of 20 seconds per frame of video recorded. A 30 second animation, 900 frames long (30 seconds×30 frames/second), would take roughly 5 hours just to record on video tape (900 frames×20 seconds/frame /60 seconds/minute/60 minutes/hour=5 hours), and would perform 900 preroll/play/record/stop sequences by the VTR.

Another way computers interact with VTRs is by capturing a frame of video to the frame buffer. For example, an image may be captured, modified, and then recorded back to the same or another video tape. The steps involved here are:

a. Position the video tape several seconds before the frame that is to be captured.

b. Start playing the video tape.

c. Shortly before the desired frame is displayed, enable the capture feature of the graphics board.

d. Wait a short time while the video image is being stored in the frame buffer memory.

e. Disable the capture feature of the graphics board.

f. Move to an unused portion of the video tape.

g. Stop the VTR.

h. Use the captured frame.

High Transfer Rate Equipment

An effective way to reduce the overhead of single frame edits is to record multiple frames in a single pass of the VTR. The straightforward solution of just recording several sequential frames is not possible on today's PCs, because they can't change the displayed image quickly enough. To produce a high quality image requires updating the contents of the frame buffer memory 30 times a second. Due to current limitations of the PC bus, it is typically only possible to update the image four times a second.

Several companies have attempted to get around the current limitation due to PC speed. "Abekas" developed hardware permitting sequential real time editing of video images by building a large, special purpose box containing lots of DRAM chips. However, this approach is very expensive.

Du Pont Pixel Systems uses an array of parallel disk drives, that together have a combined transfer rate equal to the data rate of video. Again, this is special purpose system and expensive.

Amiga Computers developed an approach in which images are generated with lower resolution, thus reducing the data transfer rate required. Such machines are inexpensive and are able to edit a contiguous sequence of frames, but they do not meet the demand for professional quality video graphics.

Calibration

A major problem in interfacing PCs and VTRs is that each VTR has different timing characteristics. It takes a finite amount of time for the VTR to respond to a command from the Controller. This time varies from one VTR and Controller combination to another so calibration of each combination is required. A common method of dealing with this problem is for a VTR Controller developer to experiment with a given VTR in the lab until these timing characteristics are determined. This requires a developer to have access to any VTR that might be used with that VTR Controller. Even after these values are found for one machine, it may be necessary to additionally fine tune the timing parameters once the VTR Controller is installed at a customer site due to a variety of reasons. For instance, since the VTR is a mechanical device, its timing parameters have a tendency to change over time and may require further calibration. Also, the system timing between the Controller and VTR might be different than the laboratory equipment.

Hardware

Since current VTR Controllers are not generally built into the computer, they must be connected to a PC in some fashion. One current method involves opening the computer and inserting a circuit board in an available slot, and assigning it a port address. This has several drawbacks. 1) Many computers don't have an unused slot. 2) Many people are not comfortable opening their computer. 3) It is hard to find an available port address due to conflicts with other boards (no single address may be available on all computers.) 4) Computer slots have varied levels of mechanical and electrical compatibility.

Detection of System Configuration

Improper connections are a common problem when connecting devices together. Another common problem occurs when the person using the equipment does not know precisely how it is configured. In either case, it is very useful for the system to be able to detect the current configuration without interfering with other components. If the system improperly attempts to communicate with a VTR Controller that isn't really there, it may cause the printer to respond, wasting paper and risking other undesirable effects.

Synchronization Signal Loopback Control

Any device that receives a video signal must be able to synchronize itself to that signal. It must be able to detect the start of a video frame and reset its internal timing to match the video input. Both VTRs and frame buffers have this ability, since they both need to be able to work with video input signals. A normal configuration involves a master source of video synchronization signal (sync), with all other devices acting as slave to that master sync source. See FIG. 3.

Without a master sync source, the device that is currently outputting the video signal must be the master for all other devices in the system. This is difficult to achieve if the system consists of a VTR and a PC with frame buffer, because the two devices form a loop. The output of the VTR goes to the input of the frame buffer, and the output of the frame buffer goes to the input of the VTR. By design, whenever the VTR receives a video or sync input, it slaves itself to that input. Likewise, when performing frame capture, the frame buffer must slave to the VTR. If they each slave to the other, the system becomes unstable due to the sync feedback.

SUMMARY OF THE INVENTION

This VTR editing system invention is able to single frame edit (write to a VTR) or capture (read from a VTR) multiple frames of video in a single pass, through interleaving the actual frames that are accessed. The invention incorporates an improved VTR Controller and improved software. A VTR editing system comprises a storage means for storing multiple frames of video data, for example, a PC hard disk; a transfer means for transferring video data input and output, a frame buffer; a control means for controlling video data edit (write) functions and capture (read) functions, a VTR Controller and PC software; and a VTR.

A VTR editing system, as depicted in FIG. 3 employing the invention is able to record 13 frames of video in 12 seconds. By contrast, the 30 second animation sequence mentioned previously can be recorded in less than 15 minutes, as opposed to 5 hours using other VTR Controllers. The invention includes additional improvements over the prior art such as automatic calibration, system configuration detection and synchronization signal loopback control.

The limitation of slow PC data transfer rates, relative to the 30 fps required by a VTR, is overcome by editing or capturing every "I"th frame, where "I" is some integer value, e.g., I=8. By recording every Ith frame in a sequence, the PC has sufficient time to read from or write to the frame buffer before the next set of frame data needs to be processed. However, since every combination of PC and VTR has different system response characteristics, a system calibration must be performed before invoking edit and capture functions.

The calibration process determines the various system timing parameters for sending commands from the Controller to the VTR to ensure proper placement of the frame of interest on the video tape. This is accomplished by recording a sequence of frames with known timing parameters and then examining the newly recorded frames to determine just when the VTR actually executed a particular function following a command from the controller invoking that function. Self calibration allows the system to optimize the particular combination of controller, VTR, and frame buffer, even though that combination of equipment has never been tested together. Calibration information for a given configuration can be saved so that when that configuration is used again, the calibration steps need not be repeated. Another advantage of self calibration is to counteract the effects of normal wear on the VTR. Since the VTR is a mechanical device, its response can change with time and use. When this happens, it is easy to perform the self calibration again, generate new values for the timing variables, and restore the system to nearly original performance.

Self calibration also allows support of VTR models that have not been studied in a VTR Controller designer's lab. This ability to adapt to new, unknown devices preserves a user's investment.

Self calibration reduces the support cost involved in setting up a VTR animation system. Since self calibration tests the single frame edit capabilities of the system, it is clear whether or not the system is properly configured.

Serial Protocol Calibration

A number of VTR's use an RS-422 serial connection to communicate with VTR Controllers. However, although many of the basic commands are the same, many VTR's use different commands or variations on the common commands. Through a process of sending most or all of the different commands and variations on commands and noting status return values, the invention determines which commands and which variations are available for a given VTR. This allows a single control program to interact with a variety of VTR models.

Rather than require the user to open their computer, the invention plugs into a standard interface already available on almost all computers, either an RS-432 serial port or a Centronics parallel printer port. It is as easy to connect the VTR Controller as it is to connect a computer to a printer. The task is much easier than installing a board inside the computer and does not require any configuration of port addresses.

An advantage of the hardware configuration of the invention is the ability to connect other devices to its pass-through connector. The invention either enables its VTR control functions and intercepts all signals or passes signals on to the printer or any other device that may be connected to it.

The invention also controls synchronization signals to prevent sync signal loopback and the resultant unstable system by disconnecting the PC to VTR signal path when the invention is capturing video data from the VTR.

DETAILED DESCRIPTION OF A PREFERRED EMBODIMENT

Figure 1:
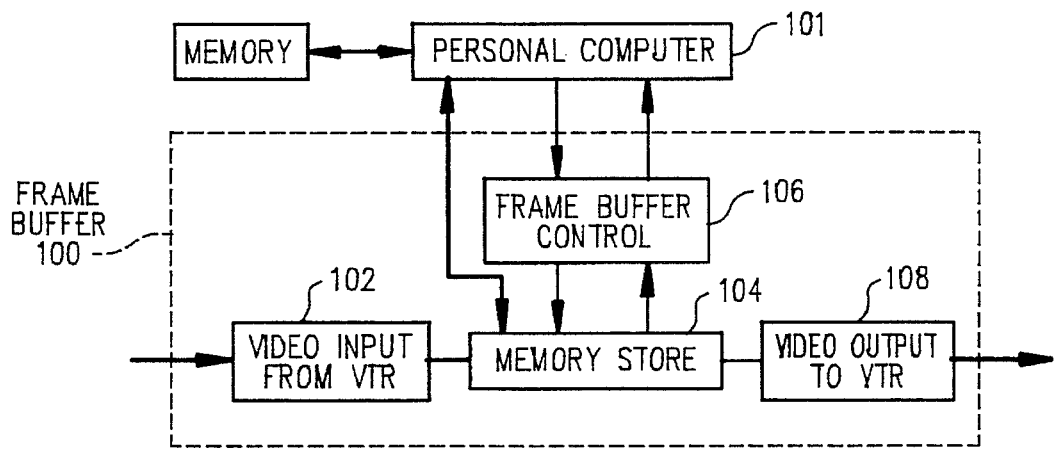
FIG. 1 is a functional diagram of a frame buffer controlled by a personal computer.
Figure 2:
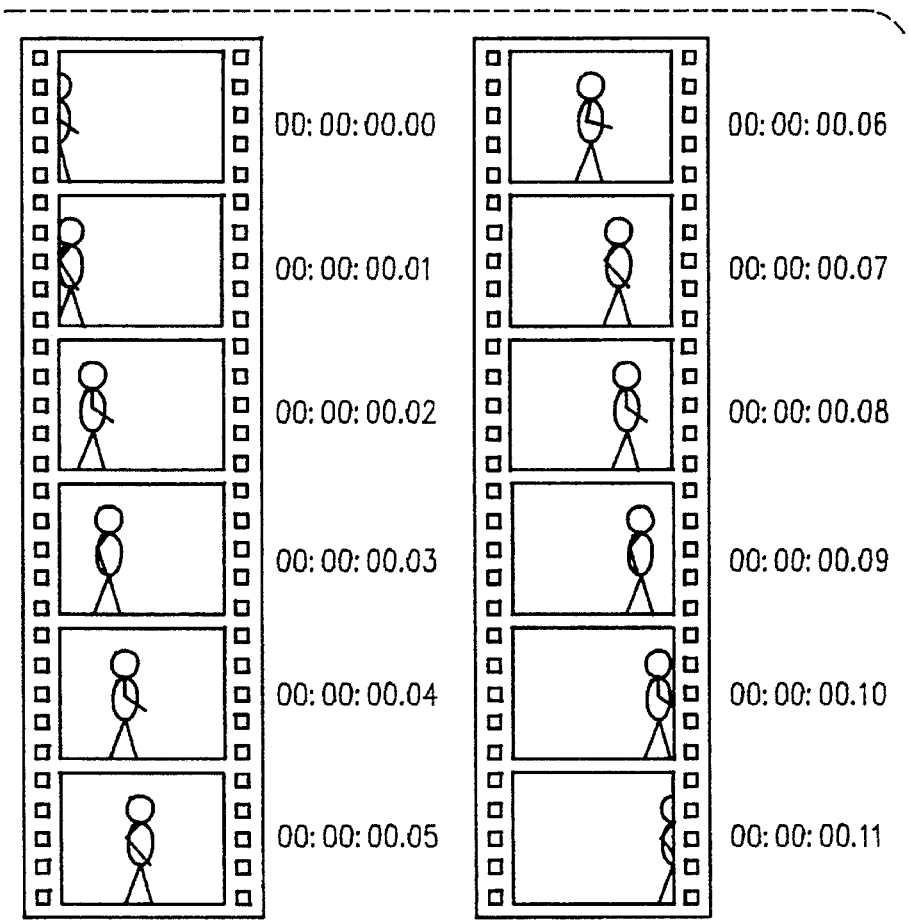
FIG. 2 depicts a sequence of video tape frames showing an animated character.

FIG. 1. shows a typical frame buffer 100 connected to a PC 101. The frame buffer 100 comprises video data transfer means, video input 102 and video output 108, for video capture and editing. The frame buffer 100 also contains a storage means, memory store 104, for storing frames of video data. The storage means could also be the data storage portion of a PC if it were capable of transferring data quickly enough to meet the timing demands of a VTR. In the preferred embodiment, memory store 104, is an intermediate storage means as it is coupled between the PC data storage means and the VTR.

Figure 3:
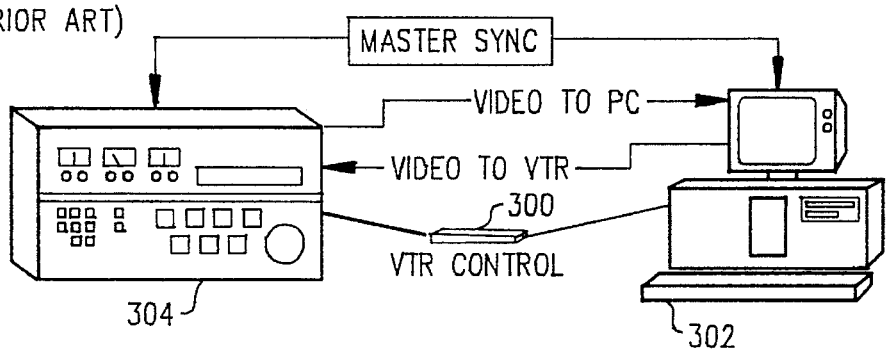
FIG. 3 depicts a typical prior art VTR editing system.
Figure 4:
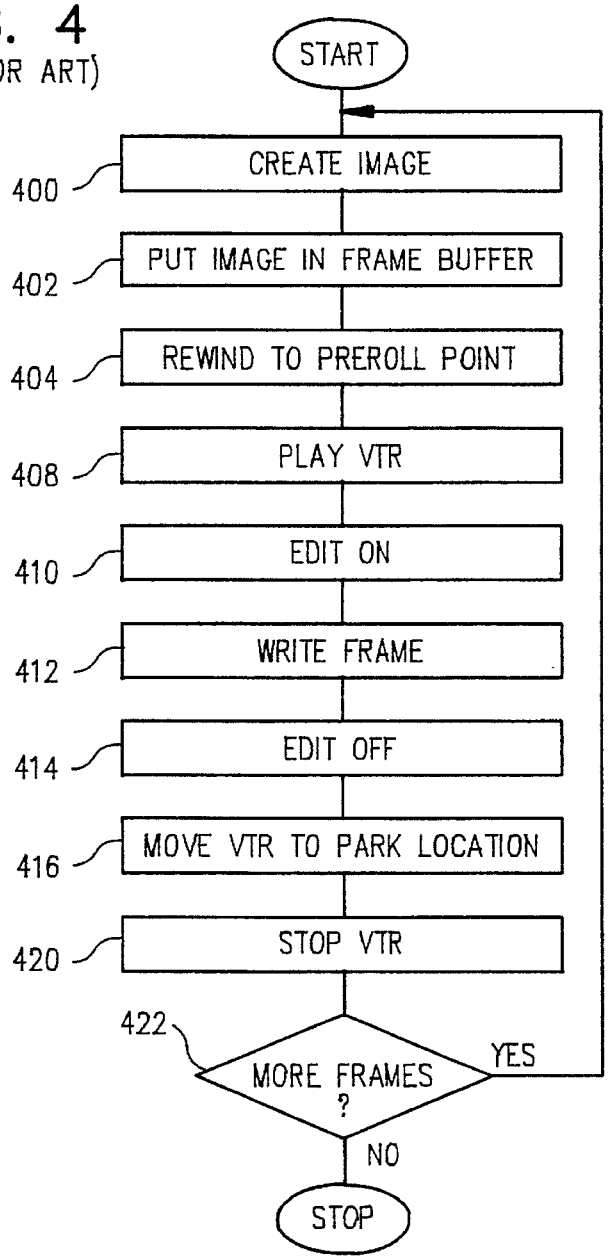
FIG. 4 shows the logical sequence of processing steps to perform single frame edits in the prior art.
Figure 5A:
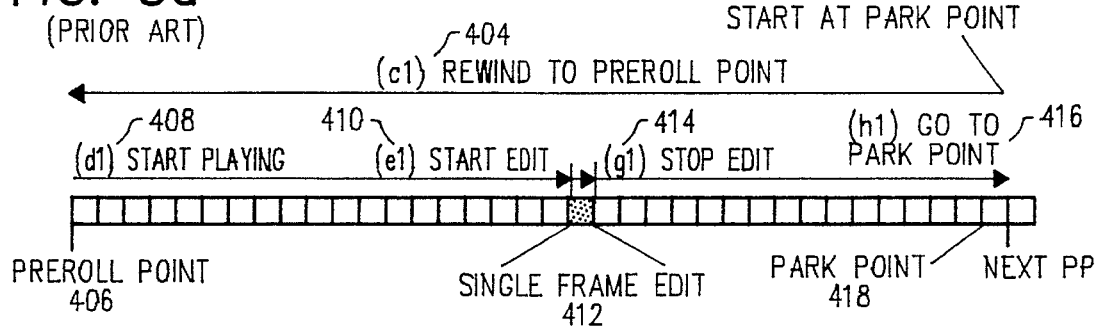
FIG. 5a–c are diagrammatic representations of the sequential steps of the prior art processing of FIG. 4.
Figure 5B:
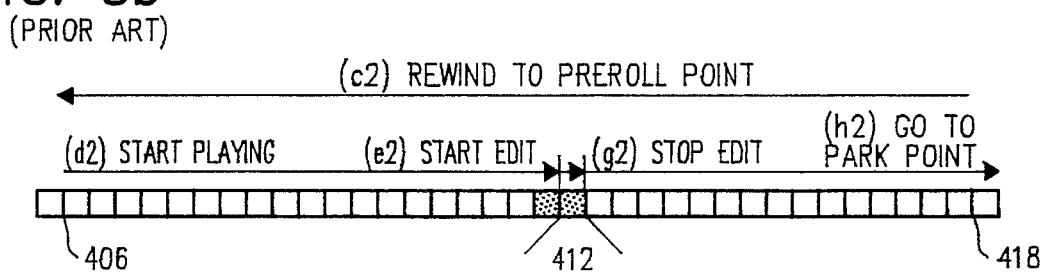
Figure 5C:
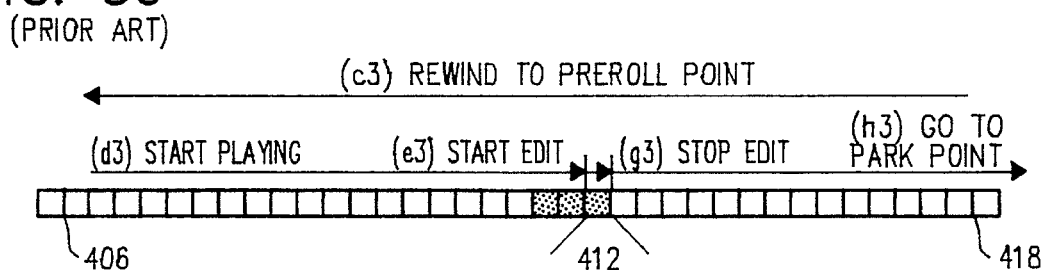

A typical configuration for video production is a Personal Computer (PC) with appropriate software, VTR with edit capabilities, a VTR Controller, and a full color frame buffer with resolution of 512H×486V pixels, at least 15/16 bits/pixel, allowing 32,768 unique colors (with one alpha bit characteristic) to be displayed. Such a configuration is illustrated in FIG. 3. A single graphic frame at this resolution requires 497,644 bytes of storage. The preferred embodiment will also work with this or other resolution frame buffers.

The invention comprises a novel switch in the VTR Controller and novel logic implemented by software in the PC. The novel logic and switch are detailed below.

Interleave Frames

Employing the invention to perform single frame edits involves recording every "I"th image, where "I" is the interleave value and is greater than one (1). "N" is the number of frames that fit in the PC fast memory. The steps to perform multiple interleaved single frame edits in a single VTR pass are set out in FIGS. 6 and 7a. (Timing values are approximate.)

a. Create N images to be recorded 600 (variable duration).

b. Load N images into the PC memory 602 (N seconds).

c. Rewind 604 the video tape to a preroll point 605 (10 seconds).

d. Start playing the VTR 606 (5 seconds).

e. Copy a frame from the PC memory to the frame buffer 608 (4/30 second).

f. Just before reaching the first edit point, turn on the VTR Edit function 610 (3/30 second).

g. Wait a short time while the frame is being recorded to video tape 612 (1/30 second).

h. Turn off the Edit function 614 (1/30 second).

i. If there are more frames in memory 616, go back to step (e).

j. If there are not more frames to edit, fast forward 617 the video tape to the park point location 618 (5 seconds).

k. Stop the VTR 620 (1/30 second).

l. If there are more frames of animation to record, move the preroll, edit, and park points forward 622, and continue with step (a) to create the next "N" images.

Figure 6:
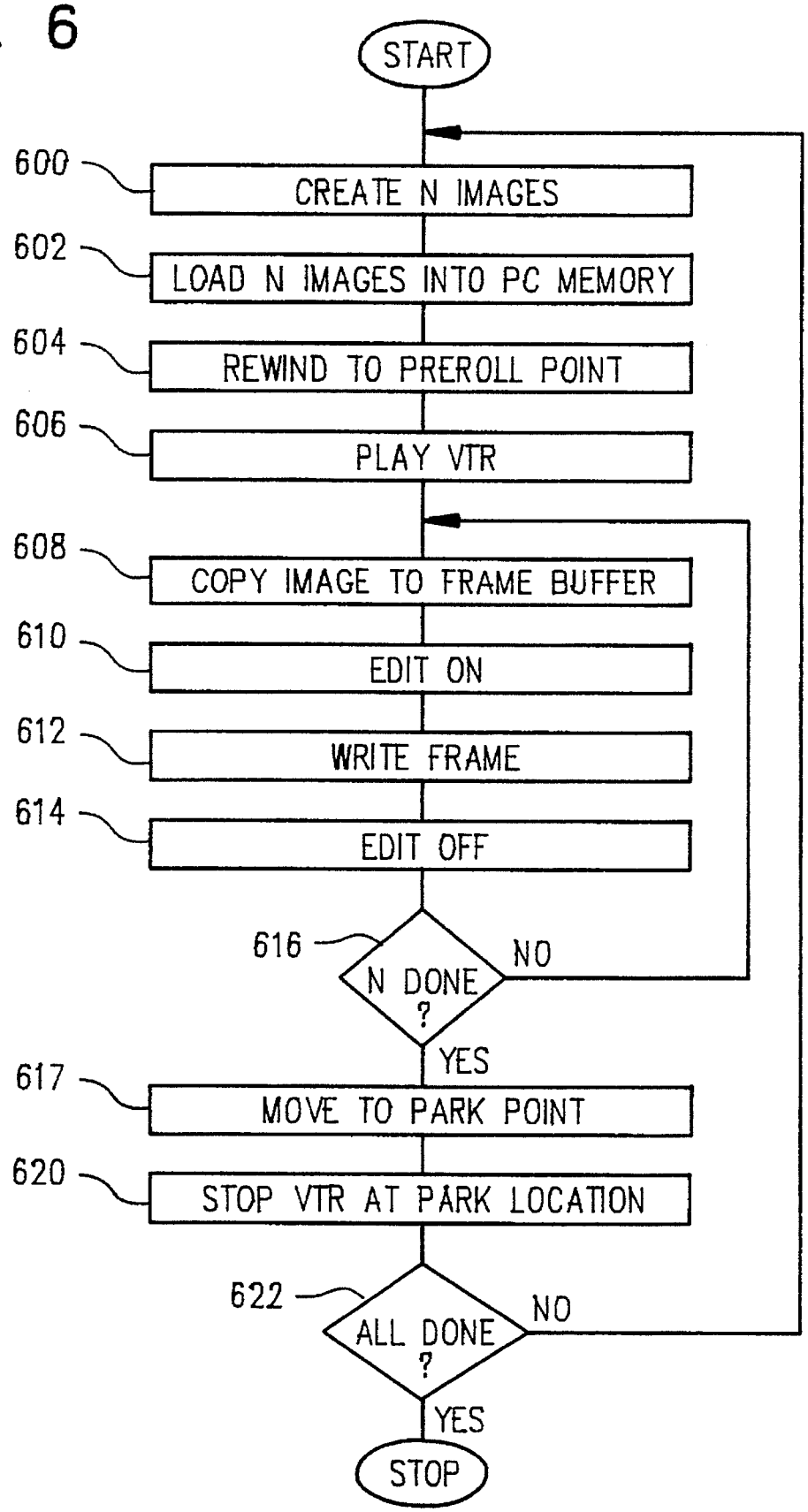
FIG. 6 shows the logical sequence of steps to perform single frame edits in the preferred embodiment of the invention.
Figure 7A:
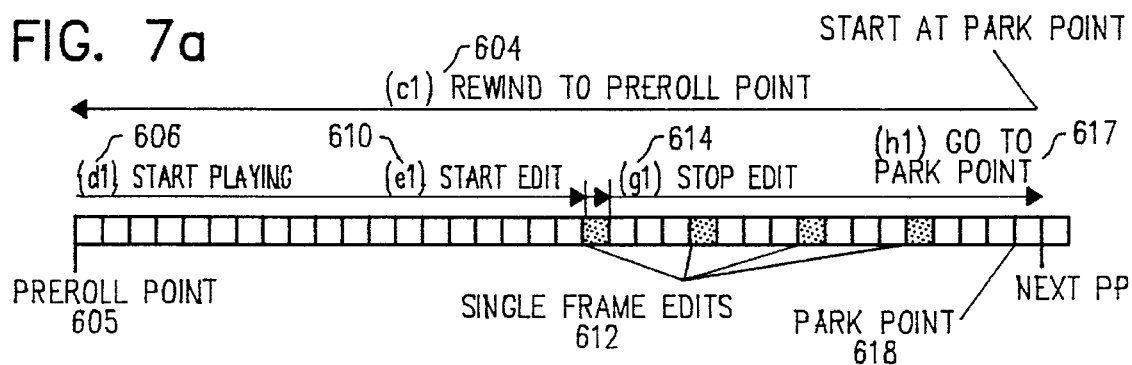
FIG. 7a–c are diagrammatic representations of the functional steps of FIG. 6.
Figure 7B:
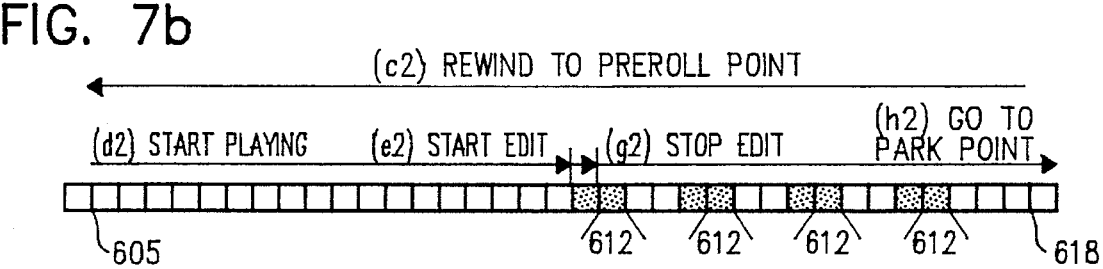
Figure 7C:
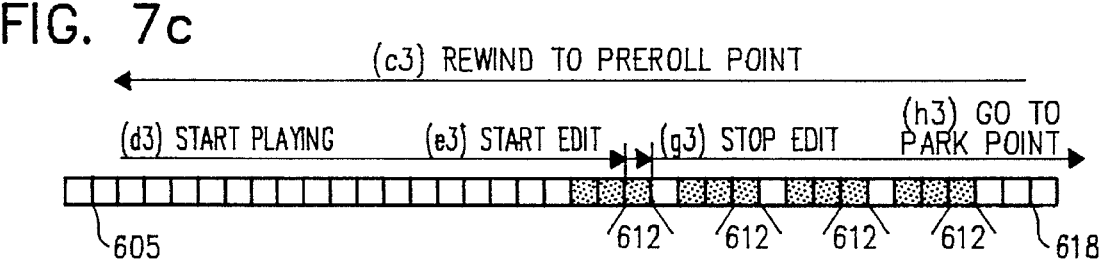

FIGS. 7a and 7b illustrate the repeated steps of FIG. 6 and 7(a). Note the advanced preroll points 605 and park points 618 and successive single frame edits 612 performed in a single pass.

To further illustrate, if an animation sequence of 100 previously created frames is to be recorded with I=8, and 13 frames of video can be loaded in the PC's fast memory, the invention would load frames 1, 9, 17, 25, 33, 41, 49, 57, 65, 73, 81, 89, and 97. Then the steps listed above would be executed, so that steps (e), (f), (g) and (h) are repeated once for each frame, a total of 13 times, with a new frame being copied into the frame buffer between each edit. Steps (c) and (d) would only be performed once per 13 frames.

Figure 8:
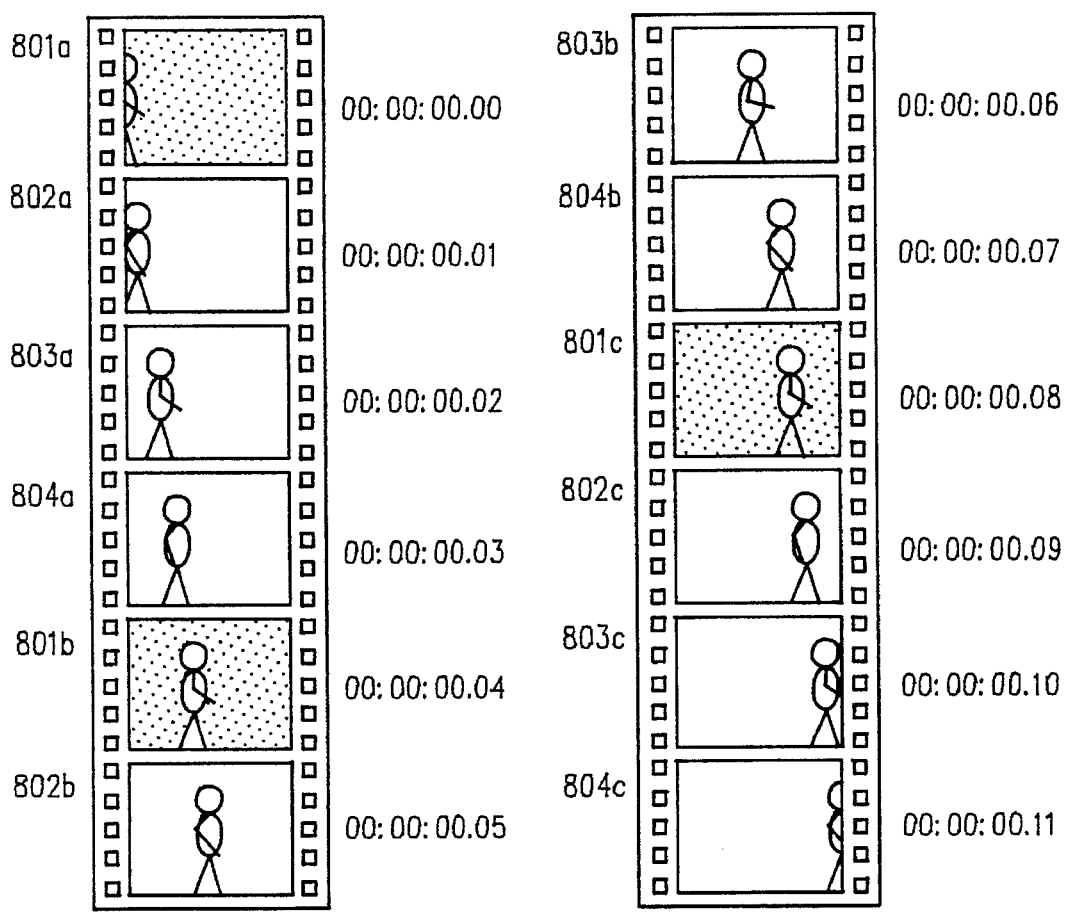
FIG. 8 illustrates a sequence of interleaved video tape frames.

FIG. 8 shows a man walking as another example of the interleaving procedure. The interleave value depicted in FIG. 8 is I=4; meaning that a single pass records one frame of each four. The first pass records frames at time code 00:00:00.00, 00:00:00.04, 00:00:00.08, etc. The second pass records frames at time code 00:00:00:01, 00:00:00:05, 00:00:00:09, etc. It requires four passes before the animation is complete. The first pass frames are labeled 801a, 801b, and 801c, and are marked with a dark background. The second pass records frame 802a, 802b, and 802c. The third pass does the frames marked 803a, 803b, 803c, while the final pass finishes the sequence with frames 804a, 804b, 804c.

This same technique is used to capture multiple frames from video tape to the computer memory. Position the video tape, begin playing the VTR, and capture every "I"th frame in the frame buffer. As a frame is captured, it is copied from the frame buffer to the computer memory. When the computer memory is full, the video tape is rewound to prepare for the next pass, and the captured frames are written to mass storage, such as the disk drive.

Simultaneous Transfer

Figure 9A:
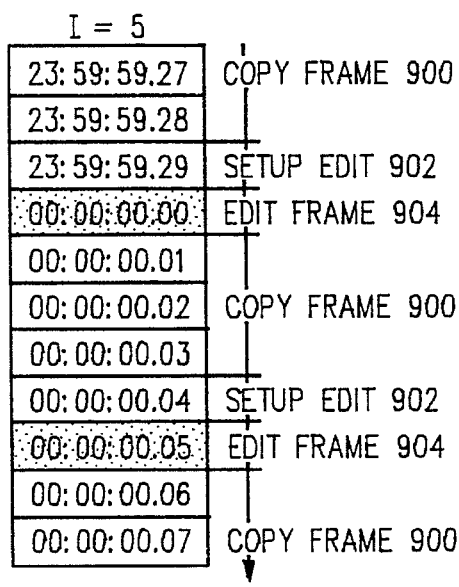
FIGS. 9a–b illustrates simultaneous transfer of frame data to reduce interleave values.

An alternative embodiment that can significantly reduce the interleave value involves simultaneously copying frame data for the next frame to the frame buffer while the frame buffer is still unloading lines of data for the frame currently being recorded ("Simultaneous Transfer"). If simultaneous transfer is not used, the process of interleaving edits involves several sequential steps as illustrated in FIG. 9a. (Assume "N" frames are in memory, and the VTR is positioned and playing.)

a. Copy pixels 900 for first frame into frame buffer.

b. Enable (setup) VTR edit 902.

c. Wait while VTR records contents of frame buffer, then disable VTR edit 904.

d. Repeat.

Simultaneous Transfer allows a reduction in the frame interleave value by beginning the copy 900 to the frame buffer of the next frame while the line by line recording 904 of the previous frame is still proceeding. The editing system software determines which lines have been displayed, and which have not. Once a displayed line is recorded, the system software replaces that line with the contents of the corresponding line from the next frame.

Figure 9B:
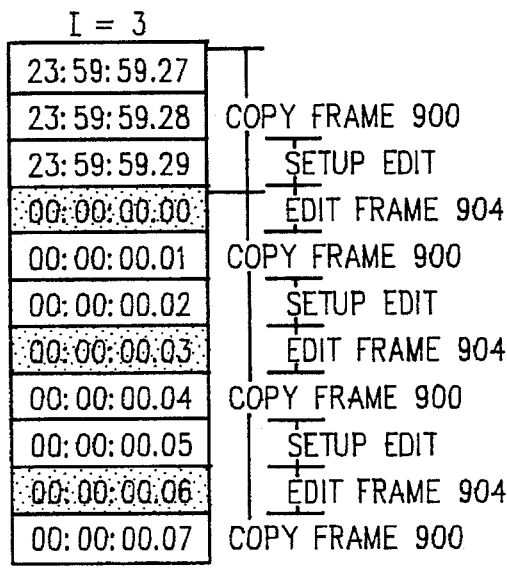

Using this method can, for example, reduce the interleave between frames from an interleave, I=5, to an interleave, I=3, as illustrated by the comparison of FIGS. 9a and 9b.

Calibration

Prior to performing edit or capture procedures as just described, a system must be calibrated. There are a number of variables involved in the timing of single frame edits and frame captures. These variables define the exact timing to use with a particular VTR. Most of these variables involve specifying the command response latency—how early must a command be issued for it to take effect at the proper time. These kind of variables are specified in two parts: the lead time in whole frames, and the offset which represents a fraction of a whole frame. It is convenient to specify the fraction offset as a negative value relative to the lead time. For example, if an edit is to occur at frame 10, and the calculated lead time is 2, with a fractional offset of −0.5, an edit command would be sent at a time corresponding to 8.5 frames, or in other words, at the midpoint of the eighth frame and 1.5 frames before the actual intended edit start location. The offset is specified in milliseconds (ms), ranging between 0 and 33, since 33 ms is one full frame duration.

The entire calibration process is automatic. Once the computer, VTR, and controller are properly connected, and a blank video tape inserted in the VTR, the editing system software directs the calibration procedure.

Figure 10:
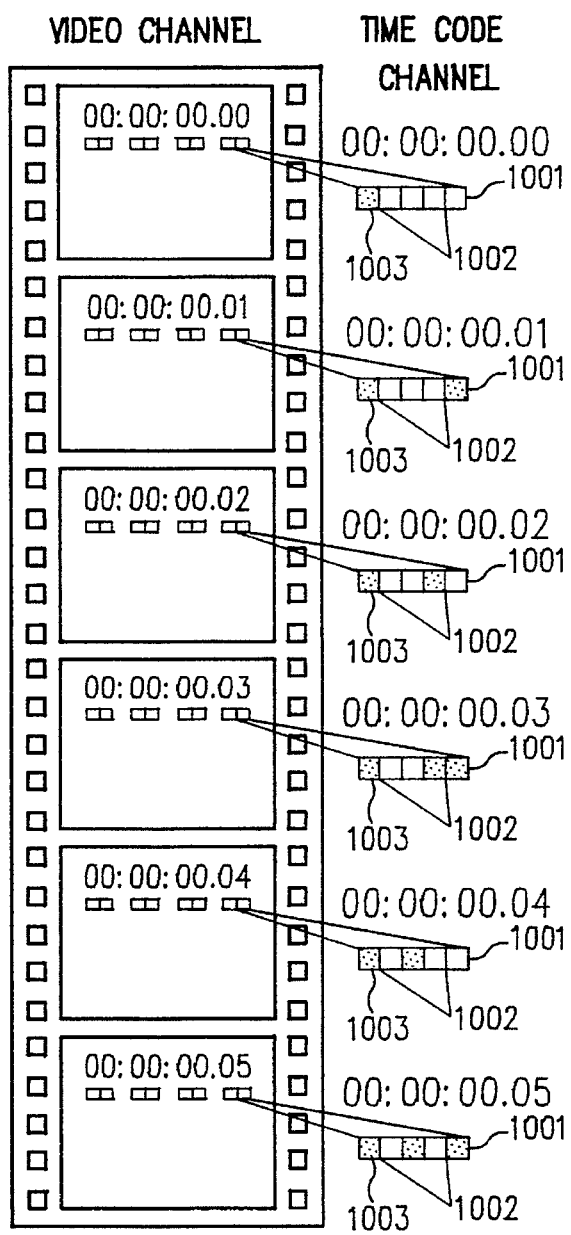
FIG. 10 depicts a sequence of video tape frames with time code written on each frame.

The first step in the calibration procedure requires the initialization of a video tape with a known pattern. In this step, the PC graphics board is used to write several minutes of a known pattern to the frame buffer which is transferred at 30 fps to the video tape's video channel, while using the frame buffer to write a corresponding identifier such as a SMPTE time code to the time code channel. For the known pattern, each frame's time code is written in human and machine readable form. The machine readable form of the time code is a simple binary pattern, as illustrated in FIG. 10, where the rightmost bits 1001 have the value 1, the next three bits to the left 1002 are 2, 4, and 8 respectively. (Note that the leftmost bits 1003 are set for each digit. This provides a reference point for detecting the start of the machine readable value.)

Write Time Code Using PC Timer and Frame Buffer

Figure 11:
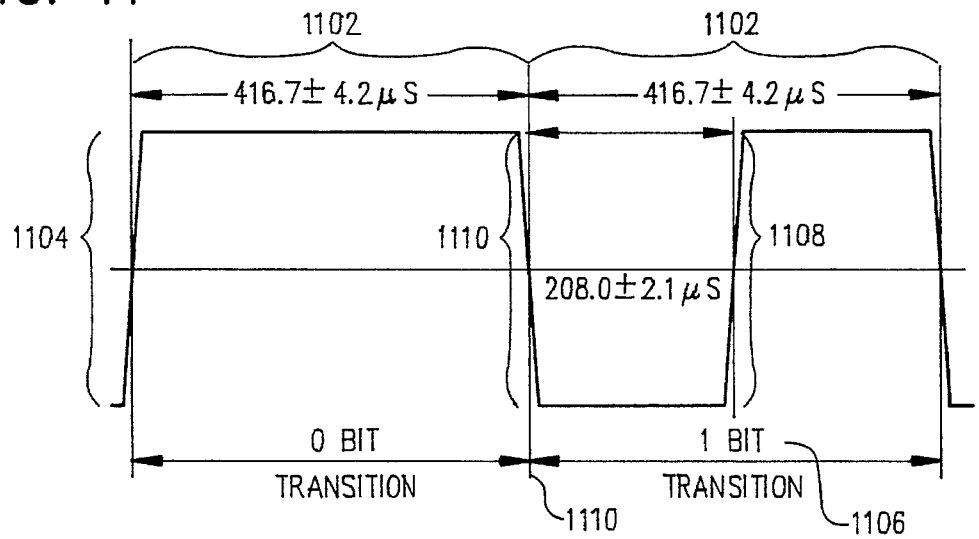
FIG. 11 illustrates digital signals defining bit types in the preferred embodiment.

The time code is written to the video tape by using the PC time and frame buffer. A total of 80 bits of information are written each frame period. Refer now to FIG. 11. Each bit has a period 1102 of 416.7 microseconds, with a leeway of plus or minus 4.2 microseconds. Each bit starts with a transition 1104 from high to low, or from low to high, depending on the level of the previous bit. A "1" bit 1106 is indicated by another transition 1108 208.0 microseconds after the initial transition 1110, while a 0 bit does not have this transition.

The precise bit level timing is controlled by the Timer/Counter chip in the PC. Most common computers, including all those compatible with the IBM PC, have a high precision counter chip. This chip has a 16 bit counter that is constantly decrementing at a 1.1932 MHz rate. When the counter reaches 0, it reloads with the value of 65,535. It is possible to get accurate relative timing by reading the current value of the counter.

When writing time code bits, the editing system software takes the current value of the PC Counter as the starting value. It then sends a transition to the time code channel on the video tape via the frame buffer and waits until it is time to make the next transition. If it is writing a "0" bit, it waits 416.7 microseconds. This is the same as waiting 497 counter ticks, since each microsecond corresponds to 1.1932 counter ticks. If it is writing a "1" bit, it waits 208 microseconds or 248 PC counter ticks, sends a transition, and again waits 208 microseconds. After sending each transition, it calculates the required elapsed time until the next event.

The 80 bit time code block must start on video line 5 of each new frame. This is ensured by checking the Current-Line register of the frame buffer, which indicates which line of video is being displayed. Several times each frame, the contents of the CurrentLine register are compared with the expected value for the bit number being written. If the bit count is ahead, the bit delay value is increased. If the bit count is behind, the bit delay is decreased. In this way, the time code bits stay in proper phase with the video being output by the frame buffer.

Read Time Code Using PC Timer

Reading the time code output by the VTR to the PC demands precise timing. When timing data is received by the PC, the editing system software records the time between transitions (low-to-high or high-to-low) received on the time code channel. The longest time is stored in the variable TimeCodeHigh. The shortest time is stored in the variable TimeCodeLow. The average of these two values is stored in the variable TimeCodeMid. Each time a transition takes longer than TimeCodeMid, it is treated as a "0" bit. Each time two transitions take less than TimeCodeMid they are combined and treated as a "1" bit. This timing takes advantage of the fact that the PC Counter keeps running even when the PC is performing other processing. The basic steps in timing the duration between signal transitions is as follows:

1) Wait for a transition. Read the PC Counter. Store this value in the variable NewCount.

2) Calculate the difference between NewCount and the variable LastCount, which stores the PC Counter variable from the last signal transition. This variable is called DeltaCount. (DeltaCount=LastCount−NewCount).

3) Store the value of NewCount in the variable LastCount, where it will be used for the next signal transition.

4) If DeltaCount is greater than TimeCodeMid, this was a "0" bit. Otherwise it is a "1" bit.

5) If DeltaCount is longer than TimeCodeHigh, store the value as a new value for TimeCodeHigh and store ½ of that value as a new value for TimeCodeLow and recalculate TimeCodeMid.

6) If DeltaCount is shorter than TimeCodeLow, store the value as a new value for TimeCodeLow and double this value as a new value for TimeCodeHigh and recalculate TimeCodeMid.

Using the PC Counter allows high resolution timing (finer than 1 microsecond resolution), while permitting the program to perform other work between signal transitions.

Read Time Code from Known Pattern Video Signal

The PC searches through the frame buffer memory, looking for the pattern of small rectangles corresponding to the machine readable time code. Each digit of time code is represented by 5 rectangles (as illustrated in FIG. 10)—one for synchronization that is always set, and 4 more that contain the value of that digit of time code. In this way, timing inconsistencies in the system can be detected by comparing the binary video digits from the video channel to the time code pattern read from the time code channel.

Show Time Code on Video Channel with Frame Buffer and Pixel Replication (Zoom)

Figure 12:
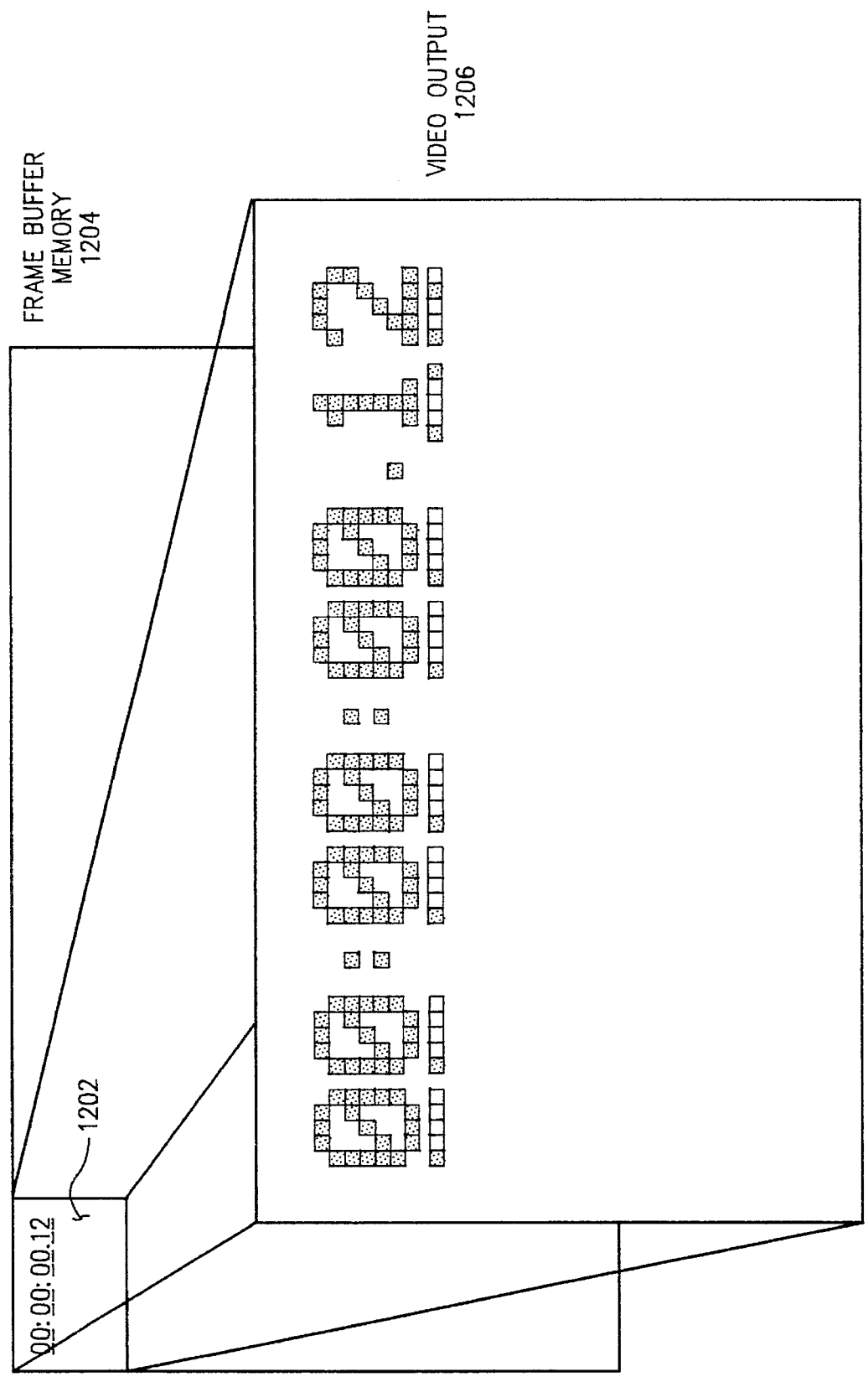
FIG. 12 shows the concept of pixel replication in the preferred embodiment.

The binary video digits must change from one frame to the next, displaying the current time code. Since it takes too long to rewrite the entire frame buffer for each frame, the frame buffer is used to "zoom in" through pixel replication. Refer now to FIG. 12. When zooming in, the frame buffer replicates a small section 1202 of the frame buffer memory 1204, with each pixel being replicated by a zoom factor both horizontally and vertically. Assume the zoom factor is 4. In this case, changing a single pixel in the frame buffer memory changes 16 pixels on the video output 1206.

Figure 13:
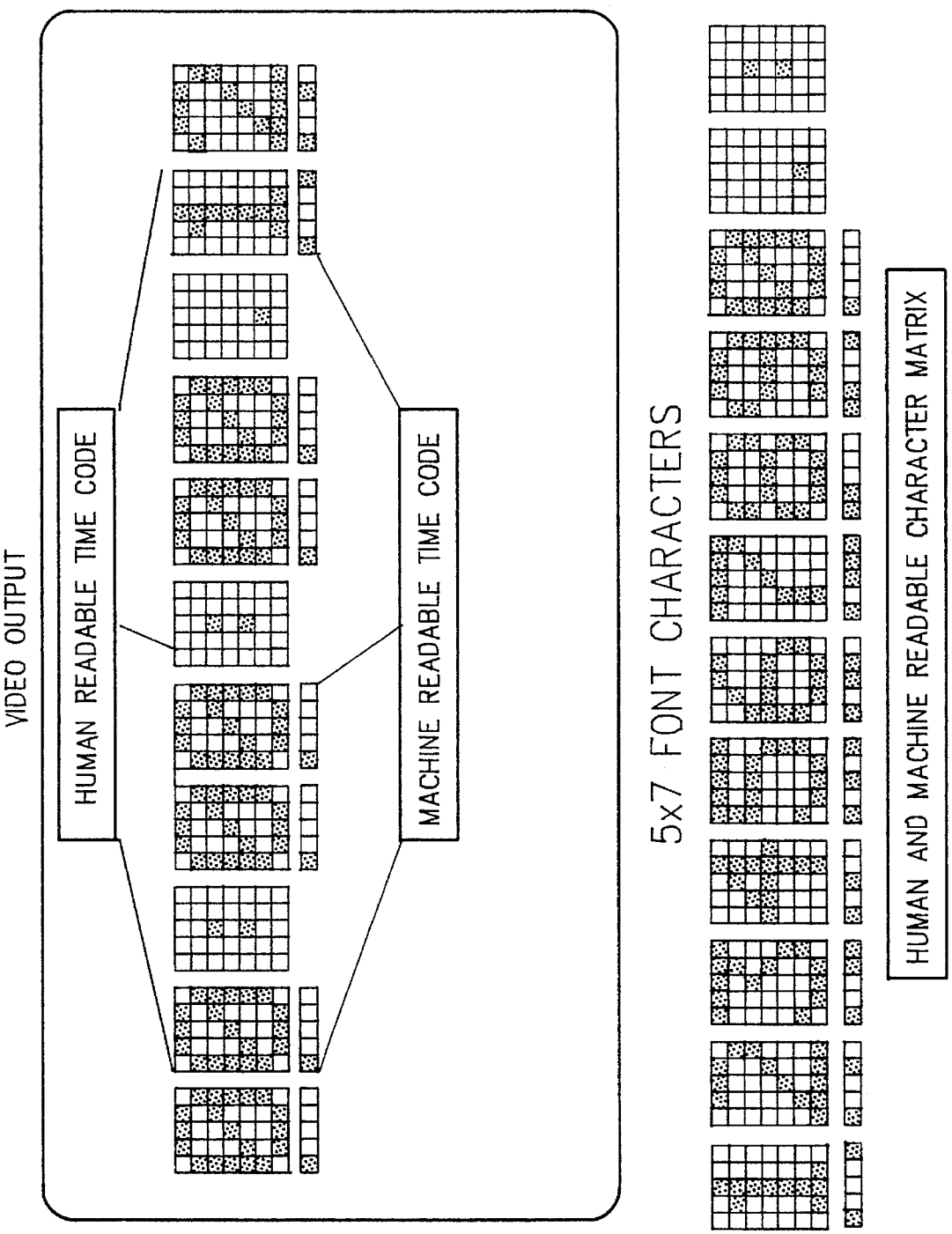
FIG. 13 shows numeric and binary representation of time code in the preferred embodiment.

Although there are 512×486=248,832 pixels in a normal screen, there are only 512/4×486/4=15,552 pixels that must be updated in the frame buffer to display the time code. The preferred embodiment writes the time code using a font of 5×7 pixels (as illustrated in FIG. 13), which can be updated in real time while writing out time code. Each digit also has a representation of its value in binary below it.

Only the pixels that change from one frame to the next need to be rewritten. Since the only changes are in the Time Code field, that means that only a maximum of 8 digits need to change each frame. Assume each digit involves 5×7 pixels, plus the 5 pixel machine readable code (as illustrated in FIG. 13). It is well within the capabilities of the PC to write in real time 8×(5×7+5)=320 pixels during a single frame.

The frame buffer must be zoomed in (selectively enlarged) so that the information is still visible after being recorded on video tape. If a 5×7 pixel font was written directly to the VTR, the information would probably be illegible after being recorded on video tape. Zooming in on these pixels, making them the size of a block of 4×4 pixels, allows them to be clearly visible even after being recorded and played back from video tape.

Once the known pattern of time code has been recorded on the video tape, the next phase in the calibration procedure is to determine the system variables for single frame edits and frame capturing.

Figure 14:
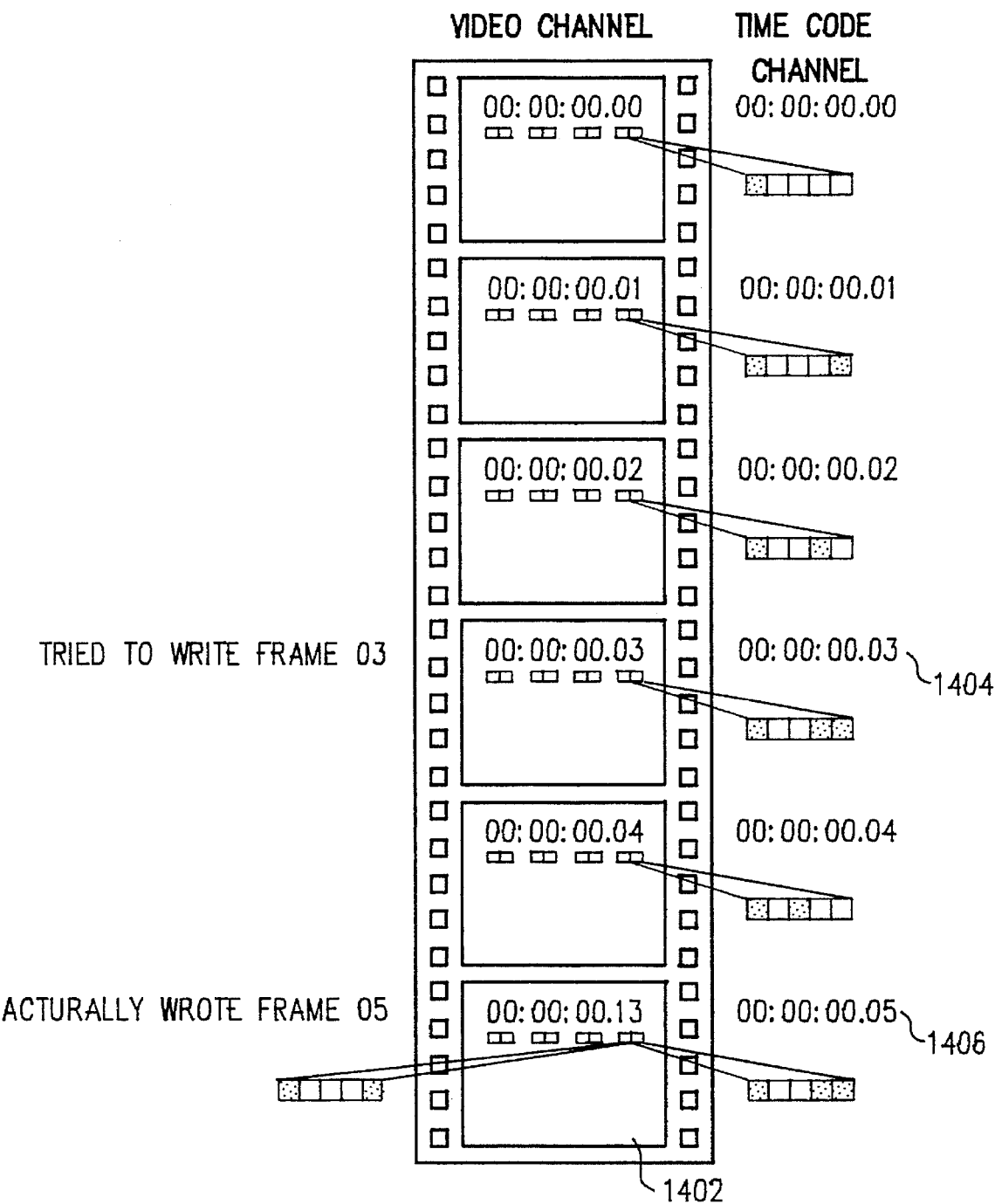
FIG. 14 illustrates a step in the self calibration process in the preferred embodiment.

To determine single frame edit parameters, the editing system software first determines the gross error. Refer now to FIG. 14. The system captures a frame of video (frame 13) 1402 and attempts to record that frame over another frame (frame 3) 1404. The system captures and examines each frame around the latter location to see where the edit actually took place (frame 5) 1406. Once the edit is found, the system subtracts the two frame values to determine the gross error (5−3=2 frames). The System then adds one to this value to establish EditStartLeadTime (2+1=3 frames). (Add extra frame to allow for fine adjustment later).

An alternative method to determine the gross error is to perform 5 single frame edits, at locations 0.10, 1.10, 2.10, 3.10, 4.10. Then, rewind the VTR and look for each edit at a different offset. For example, look at frames 0.10, 1.11, 2.12, 3.13, 4.14. This will find how far off the VTR is without needing to preroll for each trial. If the edited frame is found at 3.13, then set EditStartLeadTime to 3+1=4 (tried to edit 3.10, got 3.13, so error is 3. Add extra frame to allow for fine adjustment later).

To determine the correct offset from the gross error, the editing system software varies EditStartOffset between 0 and 90 ms, with a step size of 5 ms, performing an edit using each value. The system then determines the first and last values of EditStartOffset that produced the proper edit. The system takes the average of those two values and uses it for the final value of EditStartOffset.

Figure 15:
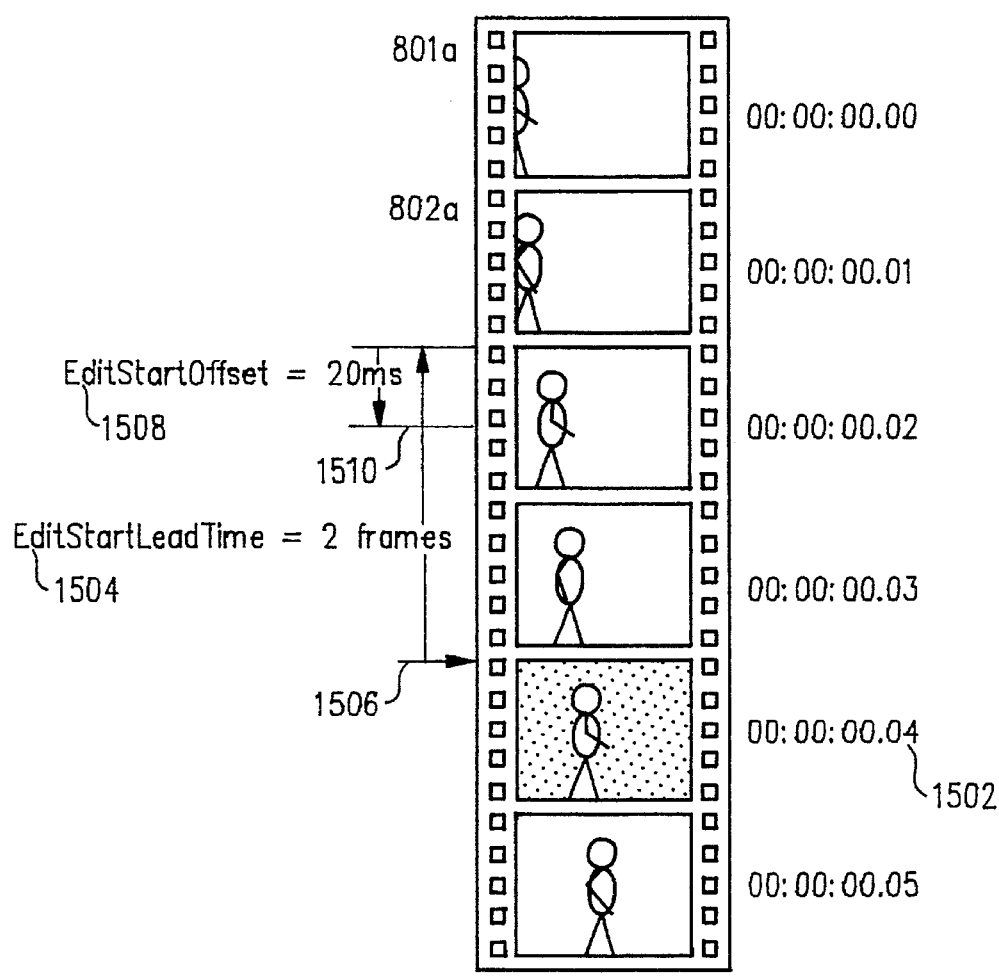
FIG. 15 depicts the use the timing parameters of the VTR editing system to accomplish single frame edits.

FIG. 15 illustrates how the single frame edit parameters variables are used. The goal is to perform a single frame edit of frame: 04 1502. The value of EditStartLeadTime 1504 is 2 frames, so count back 2 frames from edit point 1506. Upon reaching the start of frame 02, count forward the value of EditStartOffset 1508, which is 20 milliseconds, and then send the EditStart command to the VTR 1510. The two additional variables, EditStopLeadTime and EditStopOffset, are generated and used in the same way but are not shown in the illustration.

Determination of Multiple Frame Edit Parameters

Two additional parameters which are needed to perform multi-frame edits include determining the time required to copy a video frame between the computer memory and the frame buffer, EditCopyTime, and the time for the VTR to cycle in preparation for another edit, EditCycleTime. These affect the possible interleave values. The procedure for determining these parameters used by the editing system software is as follows:

1) Note current time on the PC.
2) Copy one frame of video from PC memory to the frame buffer.
3) Note new time. Elapsed time becomes the EditCopyTime.

EditCycleTime is determined by performing a multi-frame edit and similarly timing the response from the VTR. The interleave value "I" is the greater value of EditCycleTime and EditCopyTime, expressed in whole frames. If it takes 5 frames to copy a frame between the computer memory and the frame buffer, and the VTR requires 6 frames between edit commands, the smallest possible interleave is 6 (five untouched frames between each frame that is recorded or captured).

Determination of Frame Capture Parameters

Each combination of frame buffer, VTR, and PC has a fixed delay when capturing video. Self calibration allows the editing system software to determine this delay, and account for the delay when capturing frames, so the desired frame is captured into the frame buffer.

There are two steps to this calibration process. First, attempt to capture an arbitrary frame, for example, frame 10. After the frame has been captured, examine the contents to see which frame was actually captured (frame 11). Subtract the two frame values to determine the gross error (11−10=1 frame). Add one to the gross error (1+1=2 frames) and use this value as the system CaptureLeadTime variable.

Figure 16:
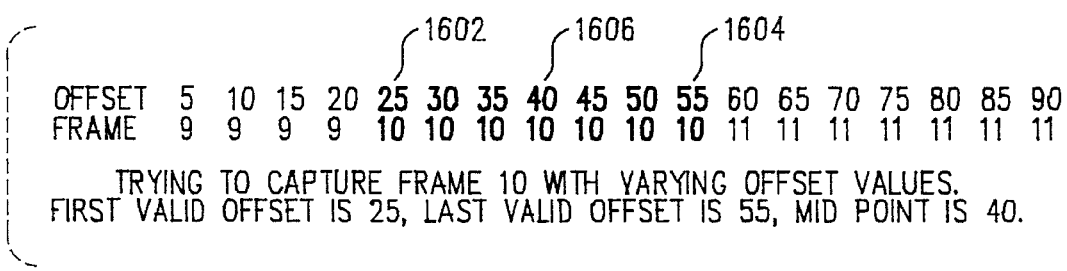
FIG. 16 illustrates the determination of VTR editing system timing parameter to accomplish video capture.

Now that the gross error is known, it is possible to determine the CaptureOffset. Refer now to FIG. 16. Vary CaptureOffset between 0 and 90 ms, in steps of 5 ms. At each step, capture a frame. Keep track of the lowest 1602 and highest 1604 values of CaptureOffset that produced the correct result. Finally, set CaptureOffset to the midpoint 1606 of the lowest and highest correct values.

Optimized Self Calibration

The self calibration procedure is optimized in the preferred embodiment to accomplish the calibration in less than five (5) minutes. The procedure is as follows (timing is approximate):

1) Go to start of video tape (20 seconds).
2) Record 2 minutes of known SMPTE video and time code, with timecode values from 00:59:40.00 to 01:01:40.00. (2 minutes).
3) Rewind to location 01:00:00.00. (10 seconds).
4) Start the tape playing, capture 1 frame to set the CaptureLeadTime variable. (1 second).
5) Capture 18 more frames to set the CaptureOffset variable (9 seconds).
6) Edit 5 frames to set EditStartLeadTime (5 seconds).
7) Back up and search for edited frame among those 5 edits (15 seconds).
8) Edit 18 frames to set EditStartOffset (20 seconds).
9) Back up and search for edited frame among those 18 edits (30 seconds).

Serial Protocol Calibration

A number of VTRs use an RS-422 serial connection to communicate with VTR Controllers. Although similar, the exact set of commands is often different among the various machines. To determine which commands are available for a given VTR, a variety of commands are transmitted by the editing system software via the VTR Controller to the VTR and the status of the return value is noted. The process involves reliance on a few simple commands, the most important of which is Sense Status.

First, the editing system software determines that the Sense Status command works, and will return status to the Controller which passes the status on to the PC. Next, the system software sends other commands and observes how they affect the status. It keeps track of which commands work. Often there are several ways of performing a single task, and a particular manufacturer's VTR may only respond to one of the commands.

Once the basic commands have been identified, the editing system software proceeds with the rest of the self calibration process, as outlined previously.

Use Printer Port for VTR Controller

Figure 17:
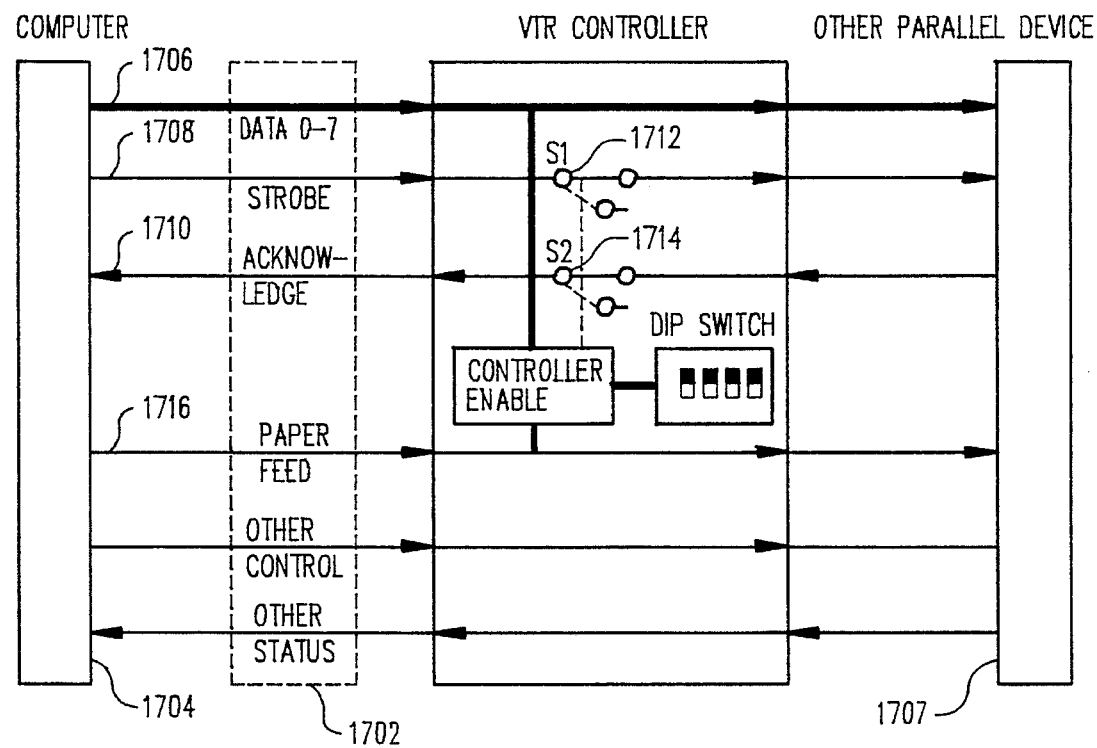
FIG. 17 is a block diagram depicting the use of a parallel communications port to control a VTR Controller.

Rather than require the user to open their computer, the VTR Controller plugs into a standard interface already available on almost all computers, either an RS-432 serial port or a Centronics parallel printer port. Refer to FIG. 17. The Centronics parallel port 1702 defines an 8 bit unidirection data interface, with additional handshaking and control lines. The computer 1704 writes an 8 bit value on lines D0–7, 1706 then tells the printer 1707 that the data is available by activating the Strobe line 1708. The printer then responds that data has been received by activating the Acknowledge line 1710. The VTR Controller acts like a printer. It receives 8 bit commands on lines D0–7, and returns status on the Acknowledge line.

Intuitive Commands Using the Printer Port Control

Because the VTR Controller acts like a printer, it is possible to send commands to the VTR that look like printer commands. This permits writing simple VTR drivers in a variety of languages that support writing to a printer. For example, sending the letter 'P' to the VTR Controller will cause the VTR to enter "play" mode. Similarly, an 'R' command will cause the VTR to begin recording. This is done by decoding a standard character code such as the ASCII (American Standard Code for Information Interchange) character sent to the printer port, and activating the proper control line of the VTR.

Pass through Printer Control

When it is not activated, the VTR Controller passes the printer control signals on, allowing the connection of a printer to the same port. See FIG. 17 again, and note the switches S1 1712 in the Strobe line 1708 and S2 1714 in the Acknowledge line 1710. When the VTR Controller is first powered up, these switches default to disabling the VTR Controller, and passing control to whatever else is plugged in to the VTR Controller. This permits use of the printer port for VTR control as well as normal printing.

While the VTR Controller is enabled, the printer is disabled. S1 prevents any commands from the Computer to the VTR Controller from affecting other parallel devices. S2 lets the computer receive status information from the VTR, not from the other devices. When the VTR Controller is again disabled, the printer is available for use from the computer.

The VTR Controller is activated by sending a specific 8 bit value over the printer port lines D0–7, 1706, and then toggling the Paper Feed control line 1716. If the VTR Controller contains an address which matches the 8 bit value, it activates switches S1 and S2, cutting off access to any other devices after it in the printer chain. Controller presence is detected by monitoring the Acknowledge line 1710. If the VTR Controller is enabled, but has no pending command, the Acknowledge status line 1710 is set to have the same value as the D4 line being sent from the computer to the VTR Controller.

The steps in detecting a VTR Controller are:
1) For each possible printer port address (there are 4), do steps 2–9.
2) For each possible VTR Controller address (there are 16), do steps 3–9.
3) Write the VTR Controller address to D0–7 of the printer port.
4) Toggle the Paper Feed line of the printer port.
5) Set a low value to D4 of the printer port.
6) If acknowledge is not low, there is no VTR Controller at this address. Go to step 2.
7) Set a high value to D4 of the printer port.

8) If acknowledge is not high, there is no VTR Controller at this address. Go to step 2.

9) There is a VTR Controller at this address, and it is enabled.

This detection method will not cause any other device to respond, since the Strobe line 1708 is not affected. It can find all of the VTR Controller devices at all possible addresses. An alternative method for finding only a particular VTR quits the process when the VTR is found.

Support Multiple Devices on Printer Port

When a VTR Controller is inactive, it passes data, control and status lines without modification to whatever device is plugged in to the pass-through connector. When it is active, nothing after it on the parallel cable will see any of the computer commands. This allows multiple devices, such as additional VTRs or a printer, to be connected in series to a single printer port, with only one device being activated at any one time.

Figure 20:
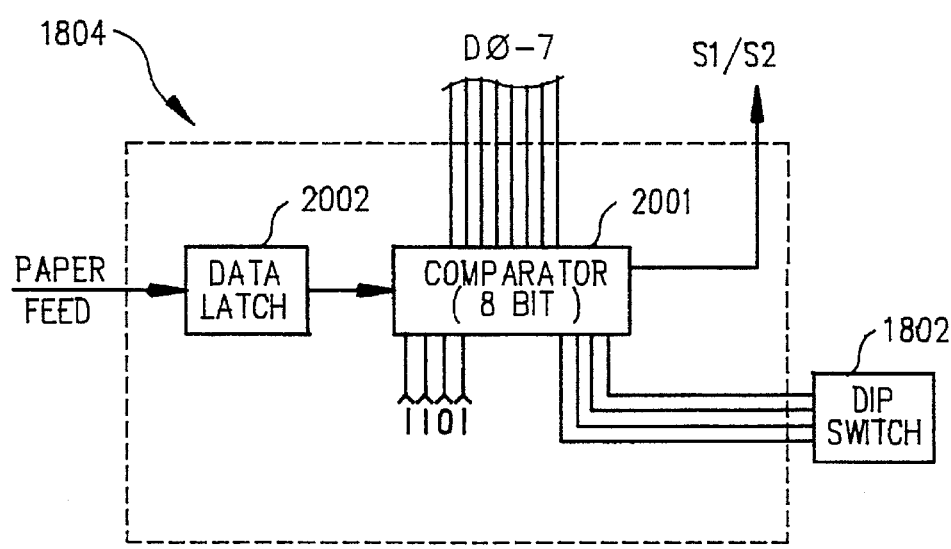
FIG. 20 is a block diagram showing the controller enable element of FIG. 18.
Figure 18:
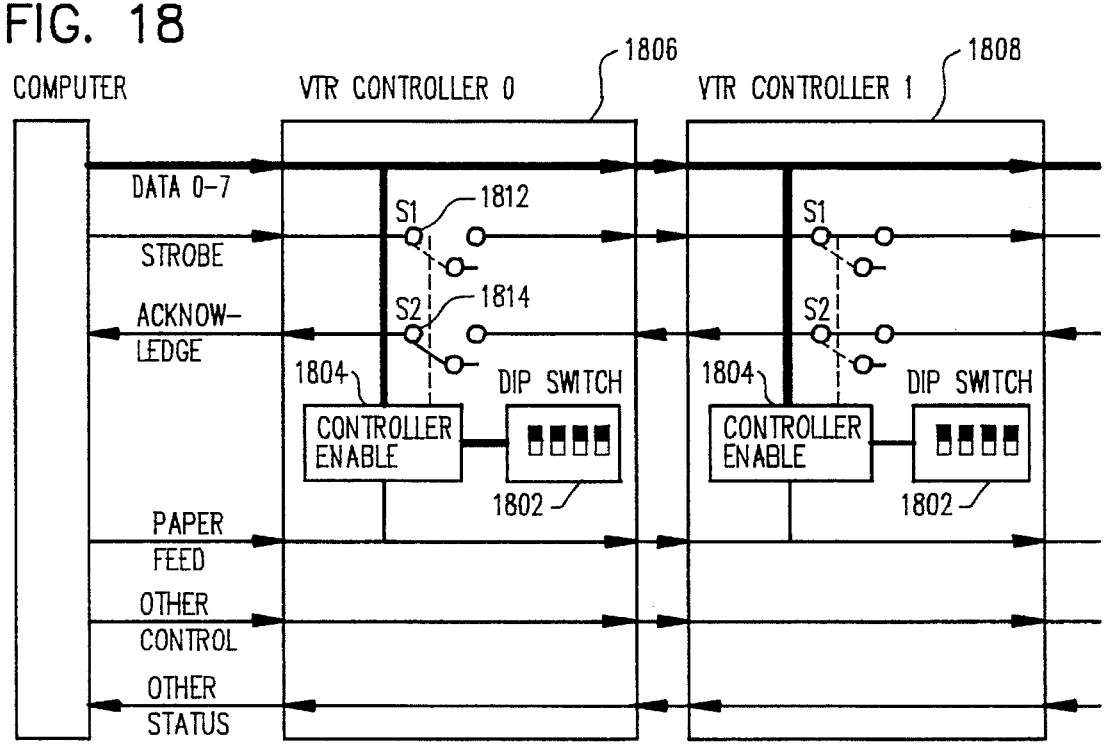
FIG. 18 is a block diagram depicting control of other parallel devices through a VTR Controller.

In one implementation, refer to FIG. 18, each VTR Controller has a 4 bit DIP Switch 1802, used for VTR Controller address selection. This switch can be set to a value between 0 and 15. The logical element titled "Controller Enable" 1804, as shown in detail in FIG. 20, contains an 8 bit comparator 2001 and a data latch 2002. The data latch 2002 is toggled by the Paper Feed line, and it captures the output of the 8 bit comparator. One side of the comparator is data lines D0–7. The other side of the comparator is set to the address of that VTR Controller. The upper 4 bits of the VTR Controller address are forced to the value 1101. The lower four bits are read from the DIP Switch 1802. Valid addresses for the VTR Controller are 1101,0000 to 1101, 1111, giving 16 total addresses. Up to 16 VTR Controllers can be on a single parallel cable. FIG. 18 illustrates two VTR Controllers on a single parallel port. VTR Controller 0, 1806, is enabled, so its switches S1, 1812 and S2, 1814, are open. This disables other devices on the cable, including VTR Controller 1, 1808. Note that the DIP Switch 1802 for VTR Controller 1 has been set to the address 0001, so it can be individually enabled.

Sync Loopback Control

Figure 19:
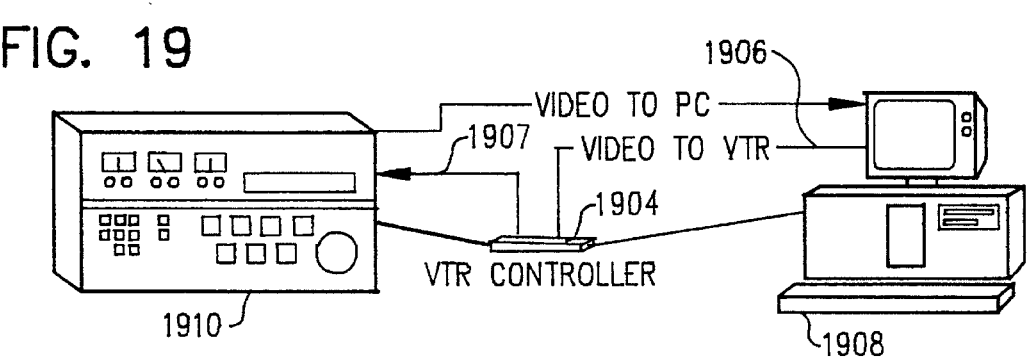
FIG. 19 is a block diagram showing the signal paths of the VTR editing system which controls synchronization signal loopback.

The invention includes a switch between the frame buffer video output 1906 and the VTR video input 1907. Refer to FIG. 19. The switch is physically located in the VTR Controller 1904. Whenever the VTR is unable to detect a master video input signal, it becomes a sync master itself. When the invention is performing frame captures, the system software in PC 1908 instructs the switch in the VTR Controller to disconnect the frame buffer video output 1906 (including the synchronization signal) from reaching the VTR 1910. The VTR then operates as master sync source, and the system is stable.

We claim:

1. An editing system for coupling to a video recorder capable of recording at a recording rate and playing back a plurality of frames of video data in a time sequence, comprising:

(a) a memory for retaining at one time a plurality of frames of video data, (b) a transfer circuit for transferring a frame of video data from the memory to the video recorder which transfer circuit has a multiple frame transfer rate slower than the recording rate of the video recorder, (c) a control circuit for causing the transfer circuit to transfer a first frame of video data from the memory to the video recorder for recording by the video recorder in a first frame location in the time sequence, then causing the transfer circuit to transfer no frame of video data for recording in the next frame location in the time sequence, then causing the transfer circuit to transfer a second frame of video data from the memory to the video recorder, which second frame is obtained from a location in the memory two or more frames away from the location of the first frame in the memory, which second frame is recorded by the video recorder in a location in the time sequence which is the same number of frames away from the first frame location in the time sequence as the number of frames between the first frame and the second frame in the memory.

2. The device of claim 1, wherein the control circuit further comprises means for repeating the actions of the control circuit a plurality of times while the video recorder continues to progress from frame to frame in the time sequence at a constant rate.

3. The device of claim 2 wherein:

(a) the transfer circuit further comprises an intermediate memory for storing a frame of video data received from the memory before transferring it to the video recorder, and (b) the control circuit further comprises means for causing the transfer circuit to transfer the second frame of video data from the memory to the intermediate memory at the same time that the transfer circuit is transferring the first frame of video data from the intermediate memory to the video recorder.

4. The device of claim 2, wherein the control circuit further comprises:

(a) means for recording frames with a known pattern on the video recorder, then sending an edit command to the video recorder to edit a frame of the known pattern, then determining which frame of the known pattern was edited, then calculating the time delay from the sending of the edit command until the edit occurred.

5. The device of claim 1 wherein:

(a) the transfer circuit further comprises an intermediate memory for storing a frame of video data received from the memory before transferring it to the video recorder, and (b) the control circuit further comprises means for causing the transfer circuit to transfer the second frame of video data from the memory to the intermediate memory at the same time that the transfer circuit is transferring the first frame of video data from the intermediate memory to the video recorder.

6. The device of claim 1, wherein the control circuit further comprises:

(a) means for recording frames with a known pattern on the video recorder, then sending an edit command to the video recorder to edit a frame of the known pattern, then determining which frame of the known pattern was edited, then calculating the time delay from the sending of the edit command until the edit occurred.

7. An editing system for coupling to a video recorder capable of recording at a recording rate and playing back at a play back rate a plurality of frames of video data in a time sequence, comprising:

(a) a memory for storing a plurality of frames of video data in a memory sequence, (b) a transfer circuit for transferring a frame of video data from the video recorder to the memory which transfer circuit has a multiple frame transfer rate slower than the play back rate of the video recorder, (c) a control circuit for causing the transfer circuit to transfer a first frame of video data from the video recorder to the memory, which first frame is stored in a first sequence location in the memory, then causing the transfer circuit to transfer a second frame of video data from the video recorder to the memory, which second frame is obtained from a location in the video recorder time sequence two or more frames away from the location of the first frame, which second frame is stored in a second sequence location in the memory, which second sequence location is the same number of frames away from the first sequence location as the number of frames between the first frame and the second frame in the video recorder time sequence, and which first frame and second frame are retained in the memory at the same time.

8. The device of claim 7, wherein the control circuit further comprises means for repeating the actions of the control circuit a plurality of times while the video recorder continues to progress from frame to frame in the time sequence at a constant rate.

9. The device of claim 8, wherein:

(a) the transfer circuit further comprises an intermediate memory for storing a frame of video data received from the video recorder before transferring it to the memory, and (b) the control circuit further comprises means for causing the transfer circuit to transfer the second frame of video data from the video recorder to the intermediate memory at the same time that the transfer circuit is transferring the first frame of video data from the intermediate memory to the memory.

10. The device of claim 8, wherein the control circuit further comprises:

(a) means for recording frames with a known pattern on the video recorder, then commencing an action to transfer from the video recorder to the memory a frame of the known pattern, then determining which frame of the known pattern was transferred, then calculating the time delay from the commencement of the action to transfer a frame until the transfer occurred.

11. The device of claim 7, wherein:

(a) the transfer circuit further comprises an intermediate memory for storing a frame of video data received from the video recorder before transferring it to the memory, and (b) the control circuit further comprises means for causing the transfer circuit to transfer the second frame of video data from the video recorder to the intermediate memory at the same time that the transfer circuit is transferring the first frame of video data from the intermediate memory to the memory.

12. The device of claim 7, wherein the control circuit further comprises:

(a) means for recording frames with a known pattern on the video recorder, then commencing an action to transfer from the video recorder to the storage memory a frame of the known pattern, then determining which frame of the known pattern was transferred, then calculating the time delay from the commencement of the action to transfer a frame until the transfer occurred.

* * * * *